United States Patent [19]

Goldhammer

[11] Patent Number: 4,815,680
[45] Date of Patent: Mar. 28, 1989

[54] NACELLE AND WING ASSEMBLY

[75] Inventor: Mark I. Goldhammer, Bellevue, Wash.

[73] Assignee: The Boeing Company, Seattle, Wash.

[21] Appl. No.: 24,580

[22] Filed: Mar. 11, 1987

Related U.S. Application Data

[63] Continuation-in-part of Ser. No. 851,116, Apr. 10, 1986, abandoned, which is a continuation of Ser. No. 687,200, Dec. 28, 1984, abandoned.

[51] Int. Cl.$^4$ .............................................. B64D 29/02
[52] U.S. Cl. ...................................... 244/130; 244/55; 244/35 R
[58] Field of Search ................... 244/54, 55, 35 R, 130

[56] References Cited

U.S. PATENT DOCUMENTS

4,314,681 2/1982 Kutney ................................. 244/54
4,524,928 6/1985 Schmidt et al. ................... 244/35 R Primary Examiner—Galen Barefoot
Assistant Examiner—Rodney Corl
Attorney, Agent, or Firm—Hughes, Cassidy & Multer

[57] ABSTRACT

A nacelle wing combination wherein said nacelle can be mounted below the wing and positioned closely to the wing, without creating excessive nacelle induced drag. The wing is contoured so that peak low pressures below the wing occur near the mid chordwise location at the lower surface of the wing. Thus, the channeling of air passing over the nacelle and under the leading edge of the wing does not create supersonic velocities which would create excessive drag.

32 Claims, 3 Drawing Sheets

NACELLE AND WING ASSEMBLY

CROSS REFERENCE TO RELATED APPLICATION

This application is a continuation-in-part of U.S. application U.S. Ser. No. 06/851,116, filed on Apr. 10, 1986, entitled "NACELLE AND WING ASSEMBLY", which is, in turn, a continuation of U.S. application Ser. No. 06/687,200, filed Dec. 28, 1984, and also entitled "NACELLE AND WING ASSEMBLY".

BACKGROUND OF THE INVENTION

1. Field of the Invention

The present invention relates to a nacelle and wing combination for an aircraft, and more specifically to a nacelle and wing combination where the nacelle can be mounted closely to the wing with a relatively low nacelle installation drag.

2. Background Art

Most recent designs for large jet powered subsonic aircraft have pod-mounted engines located beneath the wing. It is desirable to mount these engines as closely as possible to the wing lower surface in order to minimize the structural weight and wetted area of the strut supporting the engine. Another significant advantage in mounting the engines more closely to the wing is that this permits reducing the length of the landing gear necessary to keep the engines sufficiently far from the ground. However, if the engines are mounted too closely to the wing, aerodynamic interference can occur between the wing, the engine nacelle, and the strut that supports the engine.

A search of the patent literature has revealed a number of U.S. patents. These are noted below.

U.S. Pat. No. 4,314,681, Kutney, discusses the problem of aerodynamic drag that is created by mounting an engine nacelle to a wing. To alleviate this problem, the patent describes a design where there is an add-on fairing to produce certain desired aerodynamic effects. In one arrangement, the contour of the pylon is modified. In another arrangement, there is provided a "bump" at the intersection of the wing and the pylon.

U.S. Pat. No. 3,533,237, Ravone, also addresses the problem of nacelle installation drag. This patent describes a nacelle configuration which is characterized by external wall surfaces which converge in a downstream direction at small angles.

U.S. Pat. No. 3,952,971, Whitcomb, relates generally to a wing configuration where there is described certain desired lower surface pressure distributions where the flow at the lower surface accelerates rapidly to a high subsonic velocity in the forward half of the airfoil. This patent does not deal directly with the problem of nacelle installation drag.

U.S. Pat. No. 4,524,928—Schmidt, shows a wing configuration where there is a pressure distribution pattern over the lower surface where the flow at the lower surface accelerates rapidly to a high velocity in the first 10 percent to 15 percent of the chord length of the airfoil. This does not deal directly with the problem of nacelle installation drag.

U.S. Pat. No. 4,489,905—Bengelink et al, shows a wing mounted pylon having a sharp edge portion to develop a desired vortex adjacent to the pylon.

A number of other patents which were disclosed in the search appear to be no more relevant, and quite likely less relevant, than the patents noted above. Accordingly, these are being listed without any discussion of the same: U.S. Pat. No. 2,488,991, Stalker; U.S. Pat. No. 2,968,209, Kerry; U.S. Pat. No. 3,129,906, Peterson; U.S. Pat. No. 3,199,813, Roper; U.S. Pat. No. 3.614,028, Kleckner; U.S. Pat. No. 3,744,745, Kerker; U.S. Pat. No. 3,960,345, Lippert, Jr.; U.S. Pat. No. 4,050,651, Neal; U.S. Pat. No. 4,171,786, Krenz; U.S. Pat. No. 4,311,289, Finch; and U.S. Pat. No. 4,318,516, Cole.

SUMMARY OF THE INVENTION

It is an object of the present invention to provide a nacelle/wing combination where the nacelle can be mounted in close proximity to the wing without creating excessive nacelle installation drag. The wing of this nacelle/wing combination has a leading edge, a trailing edge, an upper surface and a lower surface. The wing has a spanwise axis and a chord line which is a line of maximum distance extending from the trailing edge to the leading edge. The wing has a depth dimension which is measured between the upper and lower surface along a line normal to the camber line of the wing.

The nacelle of the nacelle/wing combination is mounted to the wing at a nacelle location and contains a jet engine for propulsion which creates exhaust flow under the wing. The nacelle has an outer circumferential surface which has a rear circumferential edge portion defining an exhaust flow region. This exhaust flow region is a generally cylindrically shaped space having a cross-sectional configuration corresponding to the circumferential edge portion of the nacelle and extending rearwardly from the circumferential edge portion in alignment with a path along which engine exhaust from the nacelle flows.

The nacelle has a critical upper surface area which comprises an upper surface portion of the nacelle and an upper surface portion of the exhaust flow region. (The term "critical" is not used in the aerodynamic sense of denoting flow at the speed of sound, but rather to indicate surface areas which are significant to the present invention.) The nacelle is positioned relative to the wing so that the critical upper surface area of the nacelle is below the lower surface of the wing.

The rear edge portion of the nacelle is positioned no further rearwardly than a location that is rearward of the leading edge by a distance equal to 30% of chord length at the nacelle location.

The wing has a nacelle critical surface region which is a wing lower surface portion at the nacelle location. The critical surface region is contoured relative to the depth dimension so that peak low pressure along said critical surface region occurs at a location rearward of the leading edge at a distance equal to at least 40% of chord length.

With the arrangement described above, the nacelle can be positioned with the critical upper surface area of the nacelle being relatively close to the wing without creating excessive nacelle installation drag.

The configuration of the wing is such in the preferred form that the maximum depth dimension of the wing surface at the nacelle location is located between about 40% chord length and 60% chord length rearwardly of the leading edge at the nacelle location. Desirably, this maximum depth is located between about 45% chord length and 50% chord length rearwardly of the leading edge at the nacelle location.

Also, the pressure at the lower surface of the wing in its critical surface region at a location which is about 3/20 of the chord length rearwardly of the leading edge is at least as great as free stream air pressure, and within a more preferred range at the location at about 1/5 of the chord length rearwardly of the leading edge is at least as great as free stream air pressure.

Figure 5:
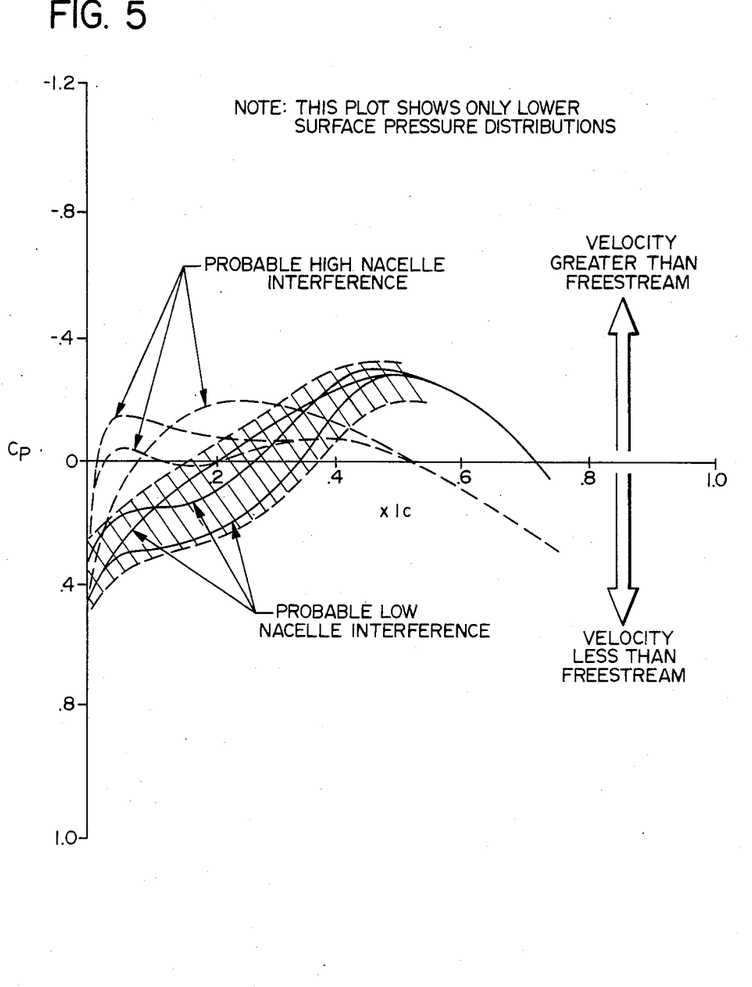
FIG. 5 is a graph illustrating three pressure distribution curves of the lower surfaces of three wing configurations which are believed to be within the allowable range of the broader scope of the present invention, three lower surface pressure distribution curves which are outside the range of the present invention, and also an area of pressure distribution curves within the broader range of the present invention.

To define the lower surface of the wing in other terms, the forward half of the lower surface of the wing at its critical surface region is contoured so as to have a pressure distribution pattern which is within the shaded area of FIG. 5.

In the method of the present invention, a nacelle/wing combination is provided as described above. The airflow that passes beneath the wing creates peak low pressures at a distance at least 40% rearwardly of the chord length at the nacelle location.

In the preferred form, the rear edge portion of the nacelle is positioned no further forward of the wing than about 0.2 chord length of the wing at the nacelle location. In a further preferred arrangement, the rear edge portion of the nacelle is positioned between zero to 0.2 chord length at the nacelle location forwardly of the wing leading edge.

Also, in the preferred form the nacelle is positioned so that the critical upper surface area is spaced below the lower surface of the wing no greater than about 0.2 chord length, and at least about 0.05 chord length.

Other features of the present invention will become apparent from the following detailed description.

DESCRIPTION OF THE PREFERRED EMBODIMENT

Figure 1:
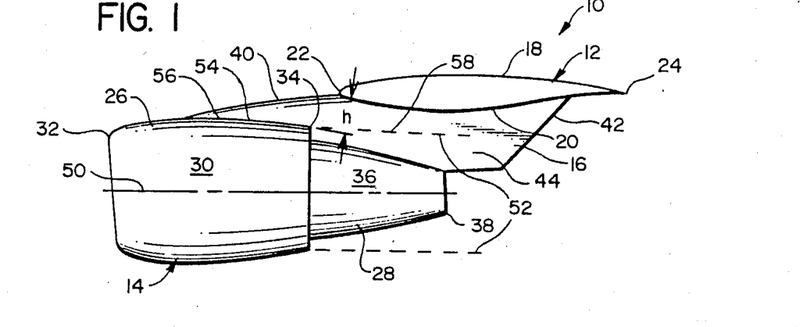
FIG. 1 is a side elevational view of a nacelle and wing combination, with the wing being shown in section taken along the chordwise axis.

In FIG. 1, there is shown a nacelle/wing combination 10, comprising a transonic wing 12, an engine nacelle 14, and a strut 16 by which the nacelle 14 is mounted to the wing 12. The wing 12 has an upper surface 18, a lower surface 20, a leading edge 22 and a trailing edge 24. The wing 20 is a transonic wing which is a wing where significant portions of the flow over the wing are supersonic.

The nacelle 14 shown herein is designed for a fan jet engine which is or may be conventional, and the nacelle 14 comprises a fan cowl 26 and a core cowl 28. The fan cowl 26 has an outer circumferential surface 30, a forward circumferential lip 32 and a trailing circumferential edge 34. The core cowl 28 comprises a circumferential side wall 36 and an exhaust end 38. The primary jet flow exits from the exhaust end 38 of the core cowl 28, and the fan jet flow is emitted in an annular pattern from the rear end of the fan cowl 26.

The strut 16 is or may be of conventional design and has a forwardly sloping leading edge 40, a trailing edge 42, and two side surfaces, one of which is shown at 44.

A quite critical feature of the present invention is the configuration of the wing 12 relative to the positioning of nacelle 14. To explain this further, reference is now made to FIG. 2. The precise contouring of the entire upper surface 18 of the upper wing 12 is not of itself critical to the present invention, and it will vary depending upon a variety of items. For example, the contouring of the upper surface 18 will depend on such things as the desired sweep and thickness of the wing, the desired cruise mach number and lift coefficient, and also the desired upper surface isobar and shock development patterns. However, the contouring of the wing upper surface is critical insofar as it affects the location of the maximum depth dimension of the wing 12.

Figure 2:
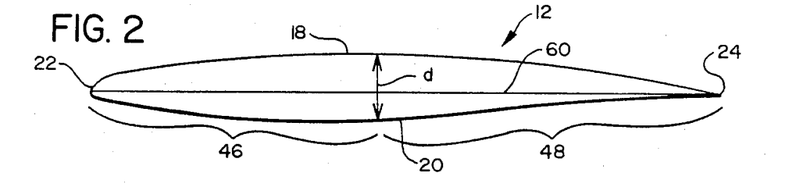
FIG. 2 is a sectional view of only the wing of one preferred form of the present invention, with the section being taken parallel to the chordwise axis of the wing.

Quite critical to the present invention is the contouring of the forward surface portion 46 of the wing lower surface 20. The contouring of the rear surface portion 48 of the lower surface 28 is not, in and of itself, critical to the present invention, but is arranged so as to be compatible with the contouring of the forward lower surface portion 46 and also the upper surface 18.

Figure 3:
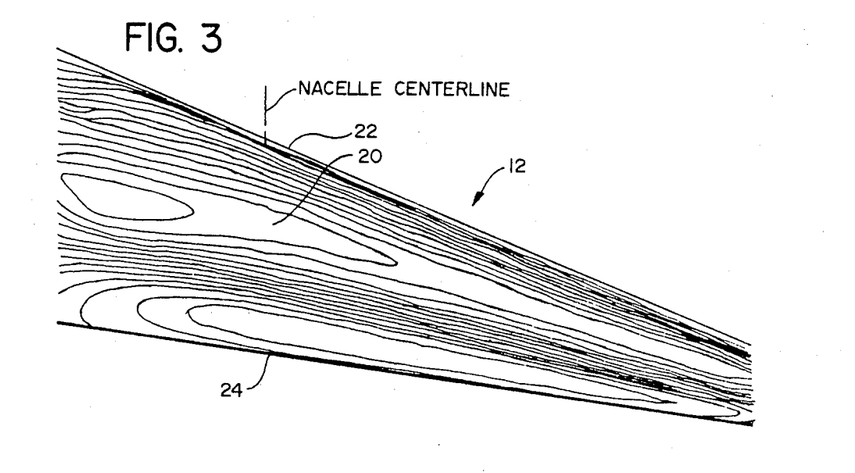
FIG. 3 is a bottom plan view of this one preferred form of the wing made in accordance with the present invention, illustrating the pressure distribution over the lower surface of the wing.

The contouring of the wing lower surface 20 is such that the lower wing surface pressure distribution in the vicinity of the nacelle attachment location is such that the peak suction pressures of the wing lower surface are, in comparison with conventional wing designs, far aft. More specifically, the peak suction pressures are at a location at least as far rearwardly from the wing leading edge 22 as 40% of the chord length at the location of the nacelle 14. The general range of the peak suction pressure is between about 40% to 60% of the chord length, measured rearwardly from the leading edge 22, and preferably between about 45% to 50%. Such a pressure distribution is illustrated in FIG. 3 where it can be seen that the peak low pressure area at the location of the nacelle centerline is at a distance between 40% to 50% of chord length rearwardly from the wing leading edge 22.

Another critical consideration is the pressure distribution in the forward part of the front half of the lower surface of the wing, and this will be discussed with reference to FIG. 5. In the design of many airfoils, it is common to shape the forward part of the lower airfoil surface so that in the first zero percent to 10 percent or 20 percent of the chord length, the flow rate increases sharply from the leading edge to cause a relatively abrupt decrease in static pressure to below free stream pressure. Three such pressure curves are shown in broken lines in FIG. 5 and labelled "probable high nacelle interference".

With further reference to FIG. 5, there are shown in full lines three curves representing the pressure distribution patterns of the forward half of the lower surfaces of three airfoils which would be within the allowable range of the broader scope of the present invention. The shaded area encompassing those three solid line curves represents the general area that would include the pressure distribution curves that would normally be expected to be within the scope of wing configurations incorporated in the present invention.

Thus, it can be seen, that in addition to the requirement that the peak suction pressures of the wing lower surface being positioned further aft, in comparison with wings of conventional design, the decrease in such suction pressures at the lower surface decrease at a more gradual rate (proceeding rearwardly along the lower surface of the wing) in comparison with wings of conventional design. In general, the pressure at the lower surface should be at least as great as, or greater than, free stream air pressure at a location approximately 3/20 of the chord length of the airfoil from the leading edge, and desirably at free stream pressure or greater than free stream pressure at a location approximately 1/5 of the chord length of the airfoil from the leading edge.

In general, the pressures along the lower wing surface at various locations, proceeding rearwardly from the leading edge, would be on a curve which would lie within a range as defined by the following numerical values:

| Location from leading edge as a % of chord length | High | Low |
| --- | --- | --- |
| 0.05 | 0.37 | 0.15 |
| 0.10 | 0.32 | 0.08 |
| 0.20 | 0.25 | −0.75 |
| 0.30 | 0.15 | −0.19 |
| 0.40 | −0.07 | −0.29 |
| 0.50 | −0.19 | −0.32 |

Also, the location of the nacelle 14 relative to the wing 12 is quite significant in achieving the ends of the present invention. For purposes of description, the nacelle 14 can be considered to have a longitudinal center axis 50 which is quite close in alignment with the direction of the flow of the core engine exhaust and fan exhaust from the nacelle 14. Further, the nacelle 14 can be considered as providing an exhaust flow region (i.e. an exhaust plume) which is a generally cylindrically shaped space, indicated at 52, having a cross-sectional configuration corresponding to that of the circumferential rear edge portion 34 of the fan cowl 26. Further, the nacelle 14 can be considered as having a critical upper surface area collectively designated 54, which upper surface 54 is made up of the upper surface portion 56 of the fan cowl 26, and also the upper surface portion 58 of the flow region 52.

In the particular embodiment shown herein, the fan cowl rear edge 34 is positioned a moderate distance forwardly of the wing leading edge 22, and the upper surface portion 56 of the fan cowl 26 is positioned so that the upper surface portion of the flow region 52 is moderately below the wing lower surface 20.

With the engine nacelle mounted in the location described generally above, it has been found that the nacelle/wing combination 10 operates quite effectively in lessening nacelle installation drag. It is believed that the following discussion provides a reasonable explanation of this improved performance. However, it is to be understood that regardless of the accuracy or completeness of the following explanation, it has been found through wind tunnel tests that the present invention does permit the engine nacelle 14 to be mounted in close proximity to the wing 12, while keeping nacelle installation drag at a relatively low level.

It is believed that the reason for this is as follows. The airflow which approaches the wing leading edge 22 and then passes below the leading edge and along the lower surface 20 is, because of the pressure distribution created by the contouring the wing lower surface 20, traveling at a relatively low velocity (in comparison with more conventional wings) just a short distance rearwardly of the wing leading edge 22, with this velocity increasing in a rearward direction to the area of peak suction pressures, after which the velocity of the airflow is reduced moderately. The effect of the nacelle 14 on the airflow is such that the air that flows between the nacelle 14 and the wing lower surface 20 becomes channeled in a relatively small flow area. This channeling of the airflow between the nacelle 14 and the wing 12 tends to cause a sharp increase in velocity, which in many prior art designs causes drag producing supersonic velocities in this area. However, because of the pressure distribution created by the contouring of the wing lower surface 20 in accordance with the teachings of the present invention, since the velocity of the air passing beneath the leading edge is in the wing alone configuration at a relatively lower velocity, the resulting increase of velocity due to the channeling effect produced by the presence of the nacelle 14 does not cause the flow in this area to go supersonic. Thus, the nacelle 14 can be tucked more closely to the wing 12 than in earlier designs without causing excessive aerodynamic interference.

Of course, if the nacelle 14 is mounted at a distance quite far ahead of the wing leading edge 22, or if the nacelle 14 is positioned well below the wing lower surface 20, then the effect of nacelle installation drag is substantially less for even wings of conventional design, and accordingly, the advantages of the present invention becomes less significant. The general range of dimensions within which it is believed that the present invention produces quite beneficial results are as follows.

First, the trailing edge of the nacelle 14 which determines the outermost perimeter of the gaseous exhaust (which in the present embodiment is the circumferential rear edge 34 of the fan cowl 26) should be positioned, relative to the leading edge 22, at a distance forwardly of the leading edge no greater than about 0.2 chord length taken at the location of the nacelle 14, and no further rearwardly from the wing leading edge 22 than about 0.3 chord length taken at the location of the nacelle 14. Further, the vertical spacing between the wing lower surface 20 and the critical surface area 54 of the nacelle 14 should be no greater than about 0.2 chord length at the location of the nacelle 14, and desirably at least about 0.05 chord length. In any event, the nacelle 14 should not be placed so closely to the wing lower surface 20 that the engine exhaust scrubs the lower surface 20. This vertical displacement dimension is indicated as "h" in FIG. 1, and is measured as the minimum distance 20 and the exhaust plume 52.

To describe now the configuration of the airfoil lower surface, reference is made to FIG. 2. There is illustrated in FIG. 2 a chord line 60 of the wing 12. The chord line 60 can be defined as the line of maximum distance extending from the trailing edge 24 to the leading edge 22. The wing 12 has a depth dimension (indicated at "d" in FIG. 2) which is the distance between the upper and lower surfaces along a line normal to the camber line. In the preferred form, the maximum dimension d should occur at approximately midchord length. In general, this maximum depth dimension d would be located rearwardly from the leading edge 22 at a distance of 40% to 60% (desirably 45% to 50%) rearwardly of the leading edge 22.

Figure 4:
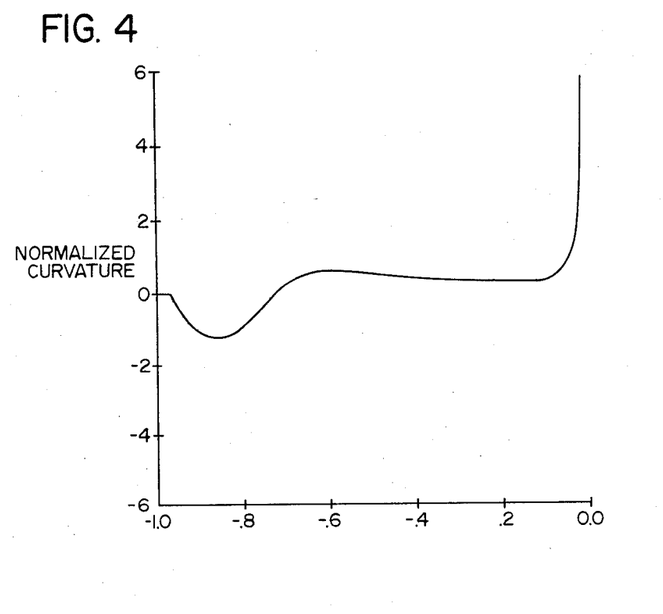
FIG. 4 is a graph illustrating the curvature of the lower surface of this wing at the nacelle location.

With reference to FIG. 4, there is a graph illustrating the degree of curvature of the lower surface 20, with the curvature at the leading edge being indicated at the right hand of the graph, and curvature of the trailing edge being indicated at the left part of the graph. It can be seen that at the leading edge 20 the degree of curvature is quite sharp. However, the lower surface configuration has a relatively constant degree of curvature from a location at about one-tenth the distance rearwardly of the leading edge 22 to a distance of approximately 65% rearwardly of the leading edge 22. In the particular airfoil shown herein, the rear portion of the lower surface 20 has a concave curvature. It is to be understood, however, that this curvature of the rear part of the lower surface 20 could be modified to achieve other aerodynamic affects without having significant effect on the operation of the forward portion of the lower surface relative to achieving the ends of the present invention.

It is to be understood, however, that the particular curvature pattern illustrated in FIG. 4 is only for one specific embodiment of the wing lower surface to produce a particular preferred pressure distribution pattern along the wing lower surface. Other curvature patterns could be used, and this will be explained below.

In designing a wing, it is common for an aerodynamicist to first determine the desired pressure distribution over the wing surface. After this pressure distribution pattern is ascertained, then the particular surface contours of the wing can be selected in a manner to produce this particular pressure distribution pattern. Thus, by defining the airfoil configuration in terms of the pressure distribution pattern, this dictates or determines the airfoil configuration. Therefore, by selecting a pressure distribution curve within the shaded area of the graph of FIG. 5, the configuration of the front half of the lower surface of the airfoil is dicatated to be within a predetermined contour range.

With regard to the manner in which the curves of FIG. 5 were determined, this based upon a combination of wind tunnel testing and analysis of the wind tunnel data derived from such testing. Since wind tunnel time is very expensive (and thus, somewhat limited), it is common for an aerodynamicist to perform wind tunnel tests to derive certain basic data, and from this data (and using the skills of an aerodynamicist), additional information can be developed with a reasonable degree of accuracy. As indicated above, this method was used to arrive at the curves and the limitations disclosed in the graph of FIG. 5.

To demonstrate the benefits of the present invention, an airplane model was built having a nacelle/wing combination as shown in FIG. 1. The wing was swept transonic wing, and the chord length of the wing at the location of the nacelle was 8.75 inches. The nacelle was a nacelle for a fan jet engine having a fan cowl and a core cowl. The length of the fan cowl was 6.4 inches and the distance from the rear edge of the fan cowl to the rear edge of the core cowl was 1.6 inches. The rear edge of the fan cowl was located forwardly of the leading edge of the airfoil at the nacelle location by a distance of 0.6 inch. The top surface of the nacelle (as indicated by the dimension "h" described above) was 0.5 inch. The fan exhaust and core engine exhaust were simulated by in accordance with conventional wind tunnel techniques.

The wing has shaped as described above, and the lower surface of the wing had the curve characteristics as indicated in FIG. 4. The maximum depth dimension of the wing was located at 45% chord length rearwardly of the leading edge. The results of this test indicated that the nacelle could be mounted beneath the wing with no increase in drag over and above the drag of the wing and the nacelle/strut measured separately. In other words, the nacelle was installed beneath the wing with no aerodynamic interference drag.

It is to be understood that the above description of a preferred embodiment is not intended to limit the scope of the present invention, and various modifications could be made without departing from the teachings of the present invention.

I claim:

1. A nacelle/wing combination, comprising:
   a. a wing having a leading edge, a trailing edge, an upper surface and a lower surface, said wing having a spanwise axis and a chord line which is a line of maximum distance extending from the trailing edge to the leading edge, said wing having a depth dimension measured between the upper and lower surfaces on a line normal to camber line of the wing;
   b. a nacelle mounted to said wing at a nacelle location and containing a jet engine for propulsion which creates an exhaust flow, said nacelle having an outer circumferential surface which has a rear circumferential edge portion defining an exhaust flow region which is a generally cylindrical shaped space having a cross-sectional configuration corresponding to said circumferential edge portion and extending rearwardly from said circumferential edge portion in alignment with a path along which engine exhaust from said nacelle flows;
   c. said nacelle having a critical upper surface area which comprises an upper surface portion of said nacelle and an upper surface portion of said exhaust flow region, said nacelle being positioned relative to the wing so that the critical upper surface area of the nacelle is below the lower surface of the wing;
   d. said rear edge portion being positioned no further rearwardly than a location that is rearward of the leading edge by a distance equal to 30% of chord length at the nacelle location;
   e. said wing having a nacelle critical surface region which is a wing lower surface portion at the nacelle location, said critical surface region being contoured relative to the depth dimension so that peak low pressure along said critical surface region occurs at a location rearward of said leading edge by a distance equal to at least 40% of chord length, and so that pressure at the lower surface of the wing at a location which is about 3/20 of the chord length rearwardly of the leading edge at the critical surface region of the wing is at least as great as free stream air pressure;

whereby said nacelle can be positioned with the critical upper surface of the nacelle being relatively close to said wing without creating excessive nacelle installation drag.

2. The combination as recited in claim 1, wherein said rear edge portion of the nacelle is positioned no further forward of the leading edge than about 0.2 chord length at the nacelle location.

3. The combination as recited in claim 1, wherein said rear edge portion of the nacelle is positioned between zero to 0.2 chord length at the nacelle location forwardly of the wing leading edge.

4. The combination as recited in claim 1, wherein said nacelle is positioned so that said critical upper surface area is spaced below said lower surface no greater than about 0.2 chord length.

5. The combination as recited in claim 4, wherein said critical surface area is spaced below the lower surface of the wing just rearwardly of the wing leading edge by a distance of at least about 0.05 chord length at the nacelle location.

6. The combination as recited in claim 1, wherein there is a maximum depth dimension of the wing at said nacelle location, said maximum depth dimension being located between about 40% chord length and 60% chord length rearwardly of said leading edge at said nacelle location.

7. The combination as recited in claim 6, wherein said maximum depth dimension is located between about 45% chord length and 50% chord length rearwardly of said leading edge at said nacelle location.

8. The combination as recited in claim 1, wherein:
   a. said rear edge portion of the nacelle is positioned no further forward of the leading edge than about 0.2 chord length at the nacelle location;
   b. said nacelle is positioned so that said critical upper surface area is spaced below said lower surface no greater than about 0.2 chord length; and
   c. there is a maximum depth dimension at said nacelle location, said maximum depth dimension being located between about 40% chord length and 60% chord length rearwardly of said leading edge at said nacelle location.

9. The combination as recited in claim 8, wherein:
   a. said rear edge portion of the nacelle is positioned between zero to 0.2 chord length at the nacelle location forwardly of the wing leading edge;
   b. said critical surface area is spaced below the lower surface of the wing just rearwardly of the wing leading edge by a distance of at least about 0.05 chord length at the nacelle location; and
   c. said maximum depth dimension is located between about 45% chord length and 50% chord length rearwardly of said leading edge at said nacelle location.

10. The combination as recited in claim 1, wherein the pressure at the lower surface of the wing at a location which is about 1/5 of the chord length rearwardly of the leading edge at the critical surface region of the wing is at least as great as free stream air pressure.

11. A nacelle/wing combination, comprising:
   a. a wing having a leading edge, at trailing edge, an upper surface and a lower surface, said wing having a spanwise axis and a chord line which is a line of maximum distance extending from the trailing edge to the leading edge, said wing having a depth dimension measured between the upper and lower surface on a line normal to camber line of the wing;
   b. a nacelle mounted to said wing at a nacelle location and containing a jet engine for propulsion which creates an exhaust flow, said nacelle having an outer circumferential surface which has a rear circumferential edge portion defining an exhaust flow region which is a generally cylindrical shaped space having a cross-sectional configuration corresponding to said circumferential edge portion and extending rearwardly from said circumferential edge portion in alignment with a path along which engine exhaust from said nacelle flows;
   c. said nacelle having a critical upper surface area which comprises an upper surface portion of said nacelle and an upper surface portion of said exhaust flow region, said nacelle being positioned relative to the wing so that the critical upper surface area of the nacelle is below the lower surface of the wing;
   d. said rear edge portion being postioned no further rearwardly than a location that is rearward of the leading edge by a distance equal to 30% of chord length at the nacelle location;
   e. said wing having a nacelle critical surface region which is a wing lower surface portion at the nacelle location, said critical surface region being contoured relative to the depth dimension so that a maximum depth dimension at said critical surface region occurs at a location rearward of said leading edge by a distance equal to at least 40% of chord length, and so that pressure at the lower surface of the wing at a location which is about 3/20 of the chord length rearwardly of the leading edge at the critical surface region of the wing is at least as great as free stream air pressure;
whereby said nacelle can be positioned with the critical upper surface area of the nacelle being relatively close to said wing without creating excessive nacelle installation drag.

12. The combination as recited in claim 11, wherein said rear edge portion of the nacelle is positioned no further forward of the leading edge than about 0.2 chord length at the nacelle location.

13. The combination as recited in claim 12, wherein said rear edge portion of the nacelle is positioned between zero to 0.2 chord length at the nacelle location forwardly of the wing leading edge.

14. The combination as recited in claim 11, wherein said nacelle is positioned so that said critical upper surface area is spaced below said lower surface no greater than about 0.2 chord length.

15. The combination as recited in claim 14, wherein said critical surface area is spaced below the lower surface of the wing just rearwardly of the wing leading edge by a distance of at least about 0.05 chord length at the nacelle location.

16. The combination as recited in claim 15, wherein said maximum depth dimension is located between about 45% chord length and 50% chord length rearwardly of said leading edge at said nacelle location.

17. The combination as recited in claim 11, wherein:
   a. said rear edge portion of the nacelle is positioned no further forward of the leading edge than about 0.2 chord length at the nacelle location; and
   b. said nacelle is positioned so that said critical upper surface area is spaced below said lower surface no greater than about 0.2 chord length.

18. The combination as recited in claim 17, wherein:
   a. said rear edge portion of the nacelle is positioned between zero to 0.2 chord length at the nacelle location forwardly of the wing leading edge;
   b. said critical surface area is spaced below the lower surface of the wing just rearwardly of the wing leading edge by a distance of at least about 0.05 chord length at the nacelle location; and
   c. said maximum depth dimension is located between about 45% chord length and 50% chord length rearwardly of said leading edge at said nacelle location.

19. The combination as recited in claim 11 wherein the pressure at the lower surface of the wing at a location which is about 1/5 of the chord length rearwardly of the leading edge at the critical surface region of the wing is at least as great as free stream pressure.

20. In a nacelle/wing combination, comprising:
   a. a wing having a leading edge, a trailing edge, an upper surface and a lower surface, said wing having a spanwise axis and a chord line which is a line of maximum distance extending from the trailing edge to the leading edge, said wing having a depth dimension measured between the upper and lower surfaces on a line normal to camber line of the wing;
   b. a nacelle mounted to said wing at a nacelle location and containing an engine to create exhaust flow, said nacelle having an outer circumferential surface which has a rear circumferential edge portion defining an exhaust flow region which is a generally cylindrically shaped space having a cross-sectional configuration corresponding to said circumferential edge portion and extending rearwardly from said circumferential edge portion in alignment with a path along which engine exhaust from said nacelle flows;
   c. said nacelle having a critical upper surface area which comprises an upper surface portion of said nacelle and an upper surface portion of said exhaust flow region, said nacelle being positioned relative to the wing so that the critical upper surface area of the nacelle is below the lower surface of the wing;
a method of creating a desired airflow pattern along said lower surface to lessen nacelle installation drag, said method comprising:
   a. positioning said rear edge portion of the nacelle no further rearwardly than a location that is rearward of the leading edge by a distance equal to 30% of chord length at the nacelle location;
   b. contouring a nacelle critical surface region which is a wing lower surface portion at the nacelle location, relative to the depth dimension so that a maximum depth dimension at said critical surface region occurs at a location rearward of said leading edge by a distance equal to at least 40% of chord length;
   c. moving said nacelle/wing combination relative to ambient air to create a flow along said critical surface region where peak low pressure occurs at a location rearward of said leading edge by a distance equal to at least 40% of chord length, and so that pressure at the lower surface of the wing at a location which is about 3/20 of the chord length rearwardly of the leading edge at the critical surface region of the wing is at least as great as free stream air pressure.

21. The method as recited in claim 20, wherein said peak low pressure is created at a location between about 40% chord length and 60% chord length rearwardly of said leading edge at said nacelle location.

22. The method as recited in claim 20, wherein said peak low pressure is created at a location between about 45% chord length and 50% chord length rearwardly of said leading edge at said nacelle location.

23. A nacelle/wing combination, comprising:
   a. a wing having a leading edge, a trailing edge, an upper surface and a lower surface, said wing having a spanwise axis and a chord line which is a line of maximum distance extending from the trailing edge to the leading edge, said wing having a depth dimesion measured between the upper and lower surfaces on a line normal to camber line of the wing;
   b. a nacelle mounted to said wing at a nacelle location and containing a jet engine for propulsion which creates an exhaust flow, said nacelle having an outer circumferential surface which has a rear circumferential edge portion defining an exhaust flow region which is a generally cylindrically shaped space having a cross-sectional configuration corresponding to said circumferential edge portion and extending rearwardly from said circumferential edge portin in alignment with a path along which engine exhaust from said nacelle flows;
   c. said nacelle having a critical upper surface area which comprises an upper surface portion of said nacelle and an upper surface portion of said exhaust flow region, said nacelle being positioned relative to the wing so that the critical upper surface area of the nacelle is below the lower surface of the wing;
   d. said rear edge portion being positioned no further rearwardly than a location that is rearward of the leading edge by a distance equal to 30% of chord length at the nacelle location;
   e. said wing having a nacelle critical surface region which is a wing lower surface portion at the nacelle location, said critical surface region being contoured so as to create a pressure pattern at a forward half of the lower surface region where there is a pressure coefficient which is within limits as follows:

| Location from leading edge as a % of chord length | Pressure Coefficent | |
|---|---|---|
| | High | Low |
| 0.05 | 0.37 | 0.15 |
| 0.10 | 0.32 | 0.08 |
| 0.20 | 0.25 | −0.075 |
| 0.30 | 0.15 | −0.19 |
| 0.40 | −0.07 | −0.29 |
| 0.50 | −0.19 | −0.32 | whereby said nacelle can be positioned with the critical upper surface area of the nacelle being relatively close to said wing without creating excessive nacelle installation drag.

24. The combination as recited in claim 23, wherein said rear edge portion of the nacelle is positioned no further forward of the leading edge than about 0.2 chord length at the nacelle location.

25. The combination as recited in claim 23, wherein said rear edge portion of the nacelle is positioned between zero to 0.2 chord length at the nacelle location forwardly of the wing leading edge.

26. The combination as recited in claim 23, wherein said nacelle is positioned so that said critical upper surface area is spaced below said lower surface no greater than about 0.2 chord length.

27. The combination as recited in claim 26, wherein said critical surface area is spaced below the lower surface of the wing just rearwardly of the wing leading edge by a distance of at least about 0.05 chord length at the nacelle location.

28. The combination as recited in claim 23, wherein there is a maximum depth dimension of the wing at said nacelle location, said maximum depth dimension being located between about 40% chord length and 60% chord length rearwardly of said leading edge at said nacelle location.

29. The combination as recited in claim 28, wherein said maximum depth dimension is located between about 45% chord length and 50% chord length rearwardly of said leading edge at said nacelle location.

30. The combination as recited in claim 23, wherein:
a. said rear edge portion of the nacelle is positioned no further forward of the leading edge than about 0.2 chord length at the nacelle location;
b. said nacelle is positioned so that said critical upper surface area is spaced below said lower surface no greater than about 0.2 chord length; and
c. there is a maximum depth dimension at said nacelle location, said maximum depth dimension being located between about 40% chord length and 60% chord length rearwardly of said leading edge at said nacelle location.

31. The combination as recited in claim 30, wherein:
a. said rear edge portion of the nacelle is positioned between zero to 0.2 chord length at the nacelle location forwardly of the wing leading edge;
b. said critical surface area is spaced below the lower surface of the wing just rearwardly of the wing leading edge by a distance of at least about 0.05 chord length at the nacelle location; and
c. said maximum depth dimension is located between about 45% chord length and 50% chord length rearwardly of said leading edge at said nacelle location.

32. The combination as recited in claim 23, wherein the pressure at the lower surface of the wing at a location which is about 1/5 of the chord length rearwardly of the leading edge at the critical surface region of the wing is at least as great as free stream air pressure.

* * * * *